United States Patent
Castro

(10) Patent No.: US 11,133,633 B2
(45) Date of Patent: Sep. 28, 2021

(54) BRUSH HOLDER FOR ELECTRIC TRACTION MOTORS FOR LOCOMOTIVES

(71) Applicant: Mersen Do Brasil Ltda, Sao Paulo (BR)

(72) Inventor: Alexandre Castro, Sao Paulo (BR)

(73) Assignee: Mersen Do Brasil Ltda., Cabreuva (BR)

(*) Notice: Subject to any disclaimer, the term of this patent is extended or adjusted under 35 U.S.C. 154(b) by 0 days.

(21) Appl. No.: 16/881,334

(22) Filed: May 22, 2020

(65) Prior Publication Data
US 2021/0119396 A1   Apr. 22, 2021

(30) Foreign Application Priority Data
Oct. 18, 2019  (BR) .......................... 102019021921-1

(51) Int. Cl.
*H01R 39/40* (2006.01)
*H01R 39/38* (2006.01)
*H02K 5/14* (2006.01)

(52) U.S. Cl.
CPC .......... *H01R 39/385* (2013.01); *H01R 39/40* (2013.01); *H02K 5/148* (2013.01)

(58) Field of Classification Search
CPC .... H02K 5/148; H01R 39/381; H01R 39/385; H01R 39/40
See application file for complete search history.

(56) References Cited

U.S. PATENT DOCUMENTS 6,822,367 B1 *  11/2004  Uchida ............... H01R 39/385
                                                       310/239
7,218,028 B2 *  5/2007   Annis ................ H01R 39/381
                                                       310/240

* cited by examiner

*Primary Examiner* — Dang D Le
(74) *Attorney, Agent, or Firm* — Bay State IP, LLC

(57) ABSTRACT

Brush holder for electric traction motors for locomotives, included in the electrical field, refers to an improvement applied to a brush holder, used in electric traction motors for locomotives, which electric coupling device is especially adapted to sustain, support and press the brush over a commuter of an electric motor rotor, while its body is connected to electric connections, being said device structurally sustained by means of isolated shafts which are connected to the locomotive structure.

9 Claims, 12 Drawing Sheets

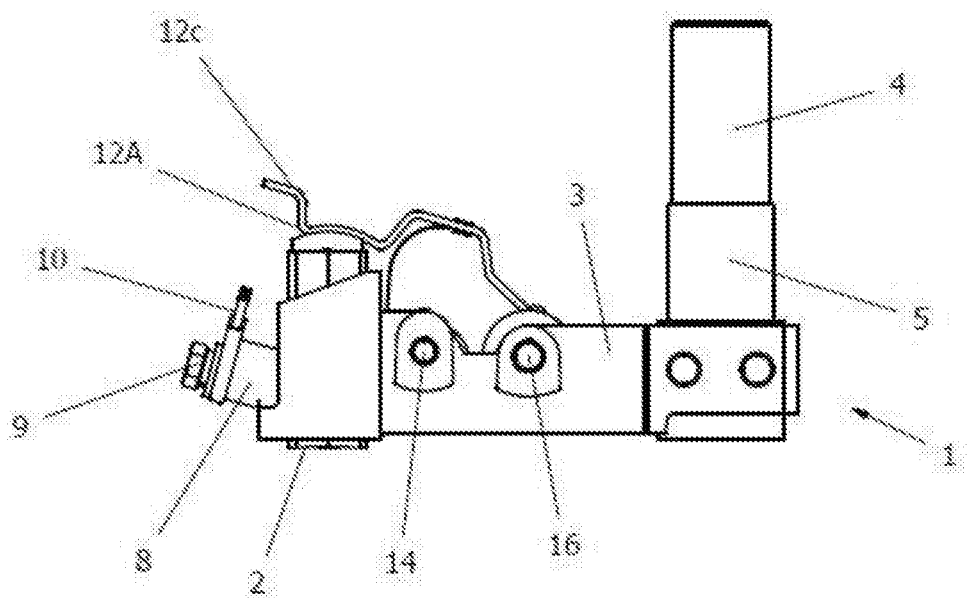
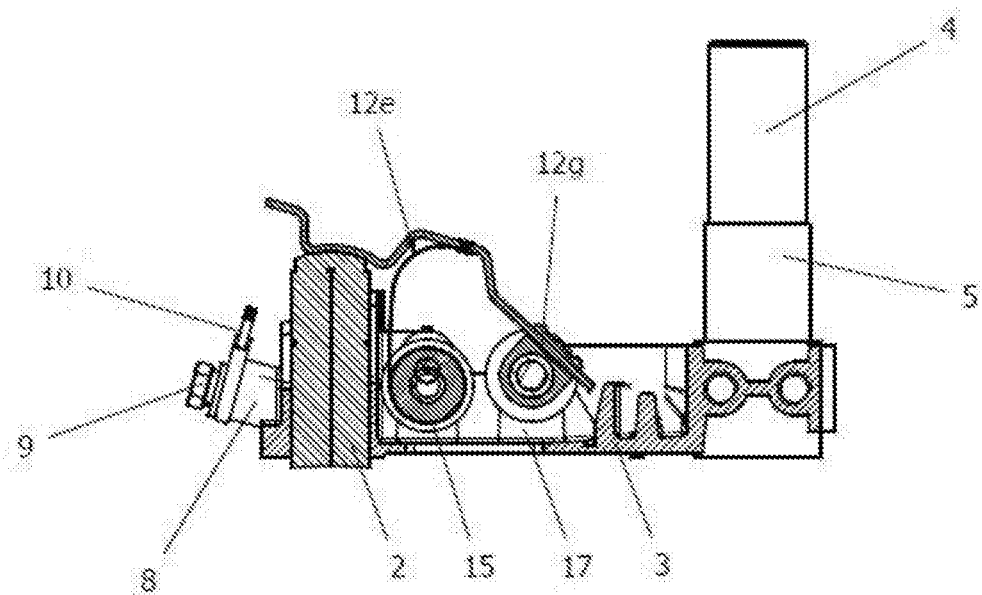

BRUSH HOLDER FOR ELECTRIC TRACTION MOTORS FOR LOCOMOTIVES

CROSS REFERNCE TO RELATED APPLICATION

This application claims the benefit of and takes priority from Brazil Patent Application No. 102019021921-1 filed on Oct. 18, 2019, the contents of which are incorporated by reference.

FIELD OF THE INVENTION

The present invention refers to the electrical field and discloses an improvement applied to a brush holder, used for electric traction motors for locomotives.

It is an improvement for an electric coupling device, especially adapted to sustain, support and press the brushes on a commuter of the electric motor rotor, while its body is connected to electric connections, said device being structurally supported by means of isolated shafts connected to the structure of the traction motor of the locomotive.

Therefore, the present patent application discloses an improvement as applied to a brush holder which is especially designed and developed to increase the performance and the working life of the brushes, reducing breakdown and maintenance costs, thus bringing large industrial advantages and to the public user.

BACKGROUND OF THE INVENTION

The propelling system of a locomotive is constituted by a diesel motor (usually with 12 to 16 cylinders), activating a generator/alternator, feeding four-pole electric motors, responsible for locomotive traction per se. Traditionally, each pole has a brush holder, constituted by a block fixed to the static structure of the motor, bearing carbon brushes contacting and sending electric current to the commuter, a device to change the direction of the electric current of a circuit in an electric motor or generator, allowing to reverse the direction of the force moving the coil and promoting the rotation of the rotor, which is the dynamic part of the motor.

Concerning direct current motors, the experts in the art know that commutation is one of the most important technical details, since it involves the inlet and outlet time for the electric current, creating alternation, which varies according to the tension levels, so to control the speed of rotation, following a desired torque.

Speed, torque and tension factors are shown below, so to define the project of a direct current electric motor, so to fulfill user's requirements:

Shaft speed: a DC engine applies a tension (V) to turn a shaft at a proportional rotation speed ($\omega$). Speed specifications for the shaft usually refer to the speed with no cargo, which is the maximum speed which can be reached by the motor when no torque is applied. Typically, the shaft speed is given in rotations or rotations per minute (RPM). Such rotations or revolutions may also be represented in radians per second (rad/s) and, for numeric calculation, the value in radians may be more convenient. The following formula discloses the ratio between radians per second and rotations or rotations per minute:

$$\omega \text{ rad}/s = \omega \text{rpm} \cdot (2\pi/60).$$

For an ideal DC motor (with no loss), the rotational speed is proportional to the supplied tension, as follows:

$\omega = j \cdot V$, wherein j is a proportionality constant, given in rad/(s.V).

Outlet torque: the shaft rotation generates a rotation force known as torque ($\tau$). Torque is given in strength-distance units (lb-ft, oz-in, N-m, etc.) and may be of one of two types: starting torque or continuous torque. Starting torque is $\tau$ wherein the speed of the shaft is zero or the motor is stopped. On the other hand, continuous torque is the highest $\tau$ under normal operation conditions. We can see from the formula that the torque ($\tau$) of a DC motor is proportional to the induction current (I), wherein, in this case, we have a torque constant (k). The following equation discloses the relations between torque and current:

$$\tau = k \cdot I \text{ or } I = \tau/k.$$

The importance of the torque constant is shown by the above equation. For a given torque, a high k value limits the current to a low value. This is an efficiency measurement, since lower current consumption means less energy (heat) dissipation. Knowing the torque constant and the produced torque, it is possible to calculate the current through the chassis, which is used to define the temperature classification.

available tension: direct current motors may be projected to work at a specific tension in case of need. However, the availability of an appropriate power supply for each application should be considered. The most common power supplies in the market are 12 VDC and 24 VDC, but converters rectifying 110 V/220 V and even higher tensions are usual, so to provide any tension level as required for an application. Speed depends on tension, and the supply may be a limiting factor if appropriate specifications for the DC motor are not made.

The construction of brushed motors is less costly than brushless ones, and their control is easier and less costly. As another feature, a brushed motor can operate in extreme environments due to its internal lack of electronic components. On the other hand, brushed motors require periodical maintenance to substitute worn brushes.

Electric motors for locomotives bear high current and use various brush holder sets around the circumferential space of the rotating commuter. Each brush holder has a housing having a plurality of individual carbon brushes assembled in stationary brush boxes or cavities.

Usually, said brushes are individually pressed to make contact with the surface of the rotating commuter by a spring mechanism. Brushes have flexible derivation wires which are connected to the brush box to guarantee good electrical flow between the brush and a main electric connection, or they receive the direct current flow from the brush holder chassis, sent to the brush holder housing by means of electric connections.

Individual brushes are subject to constant wear and need to be periodically removed and substituted. For this reason, brush holders should be installed in accessible locations. While substituting the brush, the spring is removed or moved, allowing the old brush to be taken off and a new brush to be inserted.

It is known in the state of the art that the existing brush sets are not ergonomic, hampering their easy and efficient access by maintenance personnel with their hands and tools within the limited available space.

The state of the art discloses many brush holder embodiments. As an example, document WO 2005/008848 dated Jul. 12, 2004 discloses a brush holder for a long brush with a pressure finger in a very high location when in an opened position. As a consequence, the pressure finger touches the structure. However, experience shows that the torsion springs never provide constant strength by considering a long brush. This configuration is especially an adaptation of a pressure system to support a long brush with no change to the commuter bar cover principle.

On the other hand, the document U.S. Pat. No. 5,043,619 dated Aug. 27, 1991 discloses a brush holder with a constant strength spring fixed by bolts with quick disconnection terminals for brushes. The main idea is to preserve the body with isolating pins, just changing the brush housing in case of failure or for preventive maintenance. However, this configuration is not efficient, since the space in the traction motor structure is too narrow for disassembling and assembling parts inside it.

There are also contact area rules and limits for applying brushes over the commuter, to increase its efficiency. On the other hand, in case of motor efficiency problems, caused by the project, vibration and wear, these usually affect the brush performance and increase its wearing, since it is the most fragile constituent of the set, taking the whole electric charge. Therefore, the user is usually induced to believe that the problem is the brush quality and not the motor as a whole.

This fact occurs for the lack of contextual analysis of the project and the forecasted, preventive and corrective maintenance plan, so to understand why the brushes get prematurely worn.

Furthermore, there is a range of project factors which must be added, such as e. g. changes in the brush holder measurements, so to reach better operation conditions and to reduce or even eliminate flashover occurrences.

However, based on field analysis, considering the efficiency of the carbon brush product as applied to direct current traction motors in electric diesel locomotives, high failure levels were found due to commutation problems, causing difficulties for the carbon brushes working jointly with the brush holders and commuters in those traction motors.

In summary, we conclude that the state of the art lacks a brush holder having the following features:

a brush holder holding a radial brush which is longer and has a more appropriate contact degree;

a brush having a better commuter cover to reduce the spark level and commuter deformation, supported by a good brush contact surface and better current distribution;

a brush offering better commutation and current transference from the connected brush cables to the brush holder brass body or highly conductive bronze alloys;

a brush having a spring system with constant strength to keep the brush stability from the beginning to the end;

a brush having an efficient pressure system to be moved over the higher force top of the brush by following the brush wear and keeping the pressure always in the middle of the brush (center line); and a brush containing an installation system with no changes in the existing traction motor structures.

SUMMARY OF THE INVENTION

Considering these and other various aspects and requirements of the state of the art, and attempting to apply the acquired experience in the practice of manufacturing brush holders and providing maintenance for locomotive traction motors, the inventor developed the present invention, devising an improvement applied to a brush holder, as used for the electric traction motors of locomotives, which object is to improve the brush holder, by applying simple structure and measurement changes, particularly for displacing or sloping the carbon brush, and changing the pressure spring shape of the brushes.

The invention considers the electrical configuration of each engine, maintenance requirements and the total available space in the traction motor structure. Both keep the same isolation pin.

Aiming to apply the experience acquired in the manufacture and maintenance of brush holders for traction motors, said brush holders are developed, by making simple structure and measurement changes, particularly displacing or sloping the carbon brush and the pressure system form for the brush.

The ideal coverage for the brushes on the commuter bars was defined, since it has great influence over the spark level. Since it was not respected in the previous kinds of brush holders, the new tangential measurements "t" were calculated and fixed between 23.00 mm and 28.00 mm. The axial measurements "a" were adjusted between 40.00 mm and 57.00 mm over the nominal current density. With two measurement sets, it is possible to cover different motors which may have 2, 3 or 4 brush configurations. This aspect is based on collected field data, comprising the evaluation of the electrical and mechanical conditions of the traction motor, on one side, and the impact of such conditions on brush performance, on the other side.

The present patent application discloses an improvement with all aesthetic and functional qualities, designed and developed according to the most up-to-date techniques, thus allowing its most adequate use.

BRIEF DESCRIPTION OF DRAWINGS

The disclosure part of the description is based on appropriately prepared figures, expressing preferred embodiment (s) of the product as now presented, by means of sufficiently detailed and consecutive numbers, clarifying aspects which may be realized from the adopted representation, so to determine the protection as claimed. Therefore:

FIG. 3A shows a side view of the brush holder for locomotive electric motors, containing three cavities for brushes;

FIG. 4A shows a side cut view of the brush holder for locomotive electric motors, containing three cavities for brushes;

Figure 1:
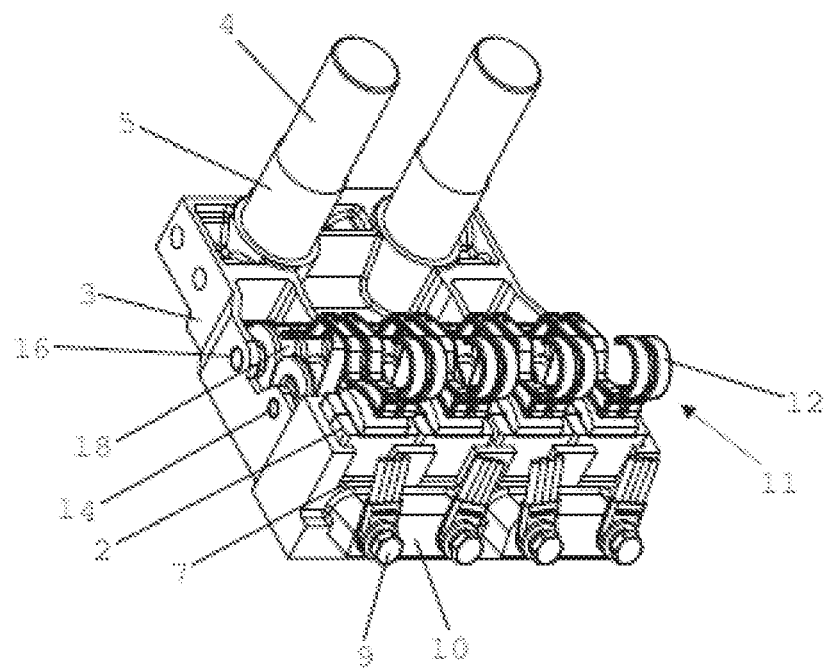
FIG. 1 shows a perspective view of the brush holder for locomotive electric motors, having two cavities for brushes.
Figure 2:
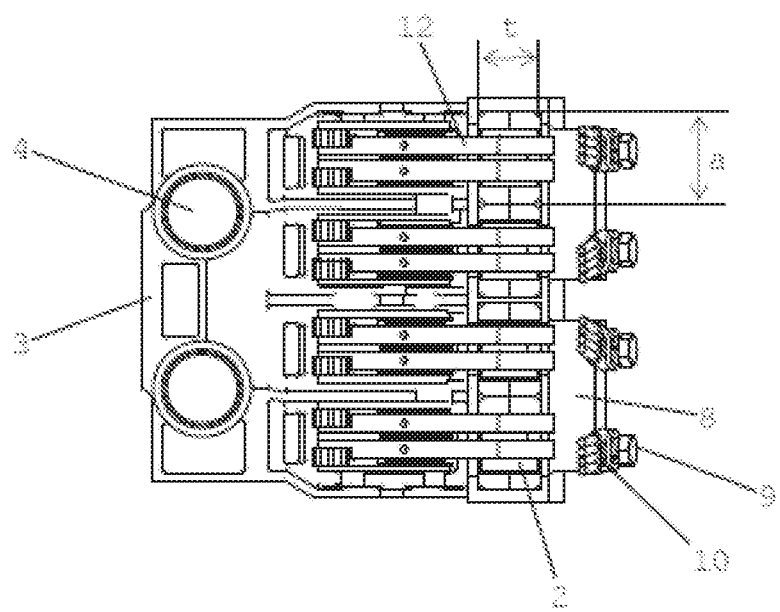
FIG. 2 shows an upper view of the brush holder for locomotive electric motors, having two cavities for brushes.
Figure 3:
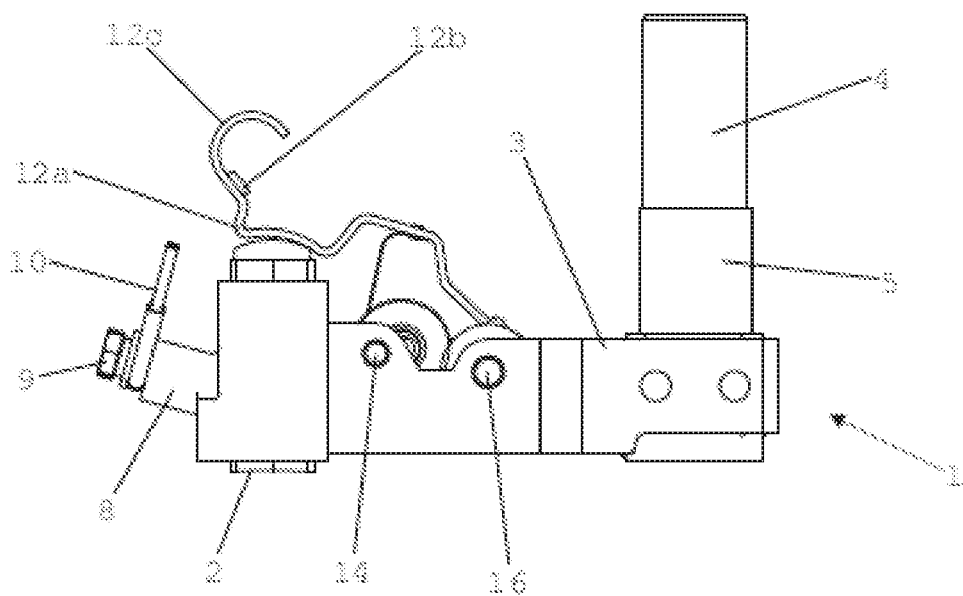
FIG. 3 shows a side view of the brush holder for locomotive electric motors, having two cavities for brushes.
Figure 4:
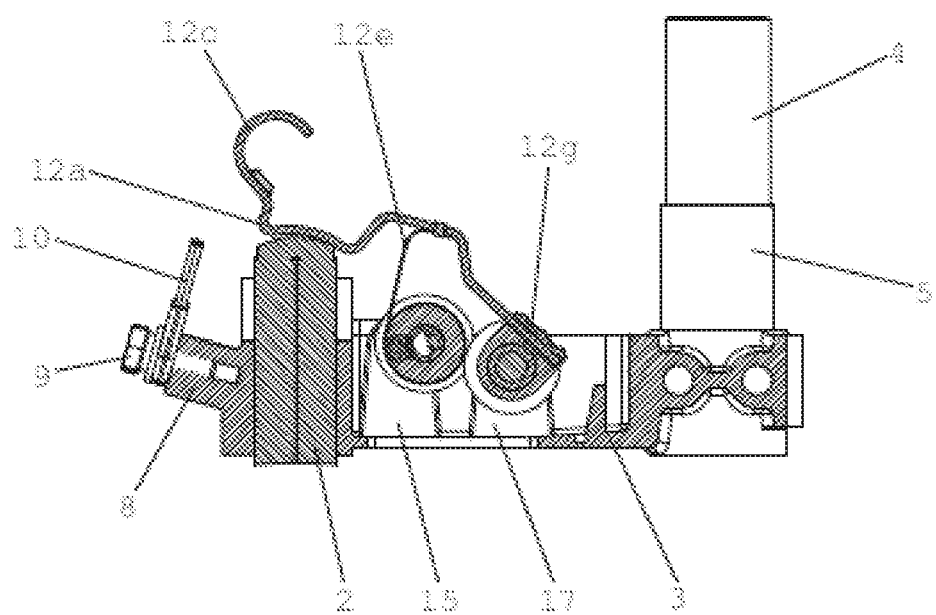
FIG. 4 shows a side cut view of the brush holder for locomotive electric motors, containing two cavities for brushes.
Figure 5:
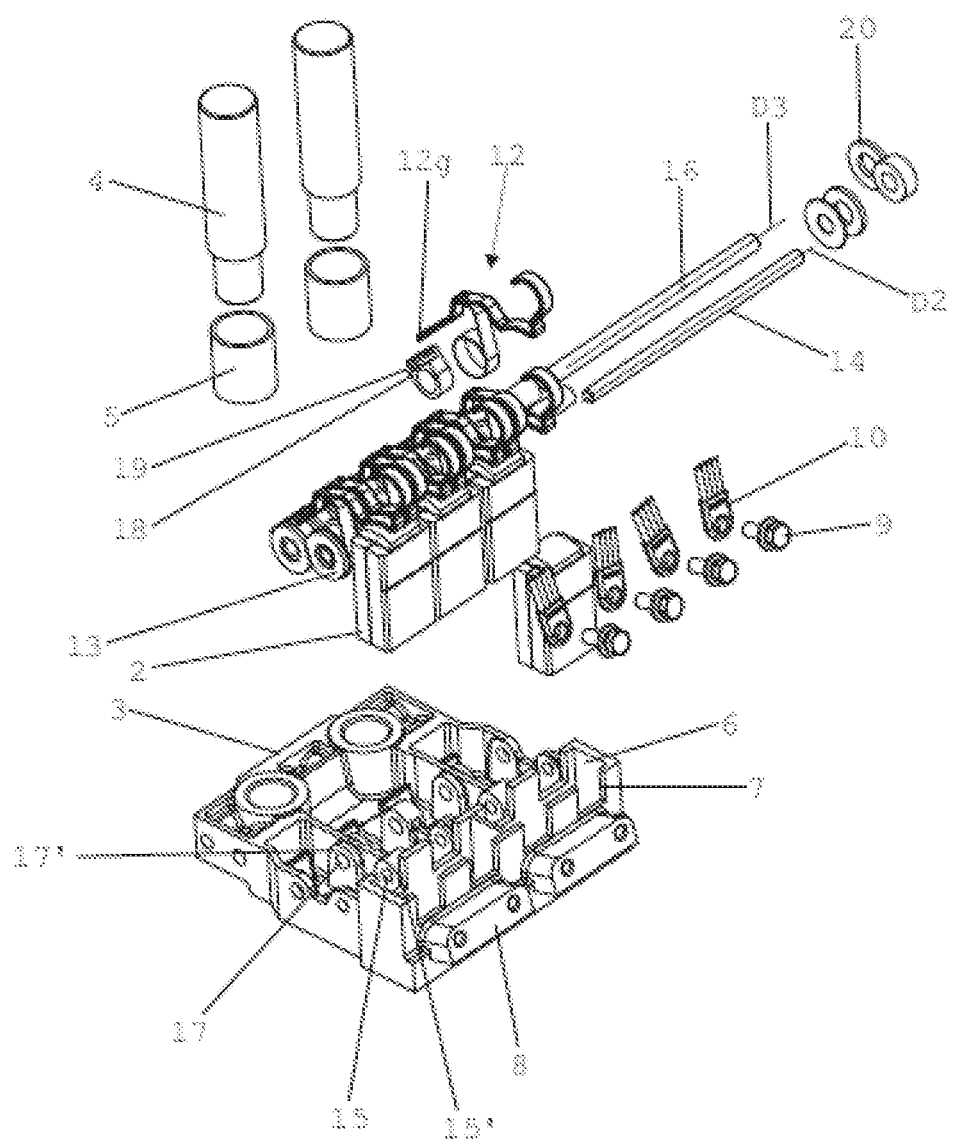
FIG. 5 shows an upper exploded perspective view of the brush holder for locomotive electric motors, containing two cavities for brushes.
Figure 6:
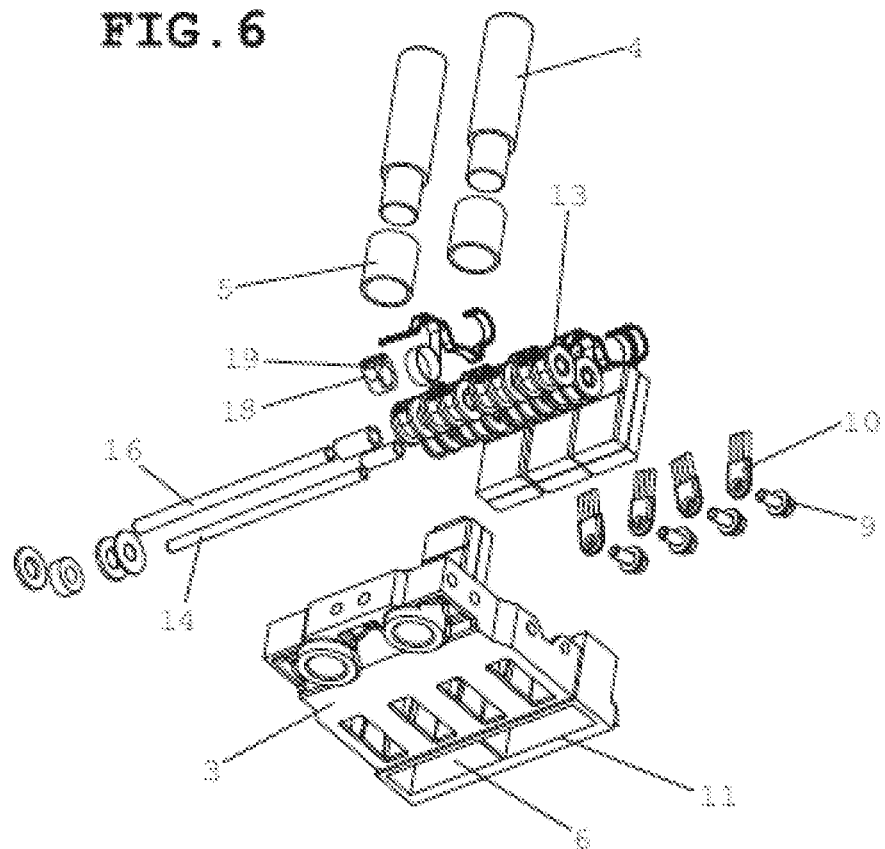
FIG. 6 shows a lower exploded perspective view of the brush holder for locomotive electric motors, containing two cavities for brushes.
Figure 7:
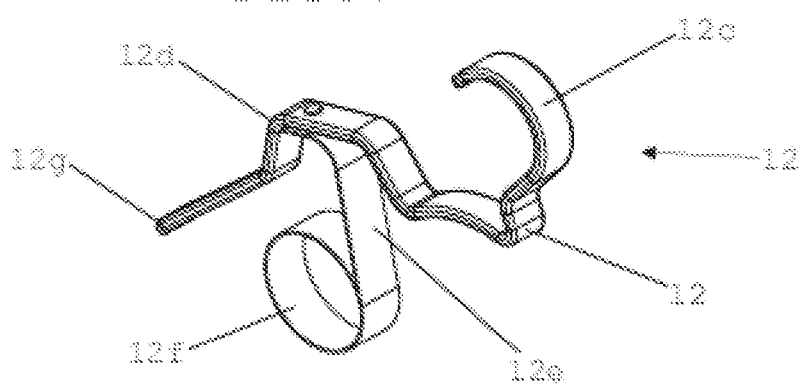
FIG. 7 shows a perspective view of the spring, which is an integral part of the brush holder for locomotive electric motors, containing two cavities for brushes.
Figure 1A:
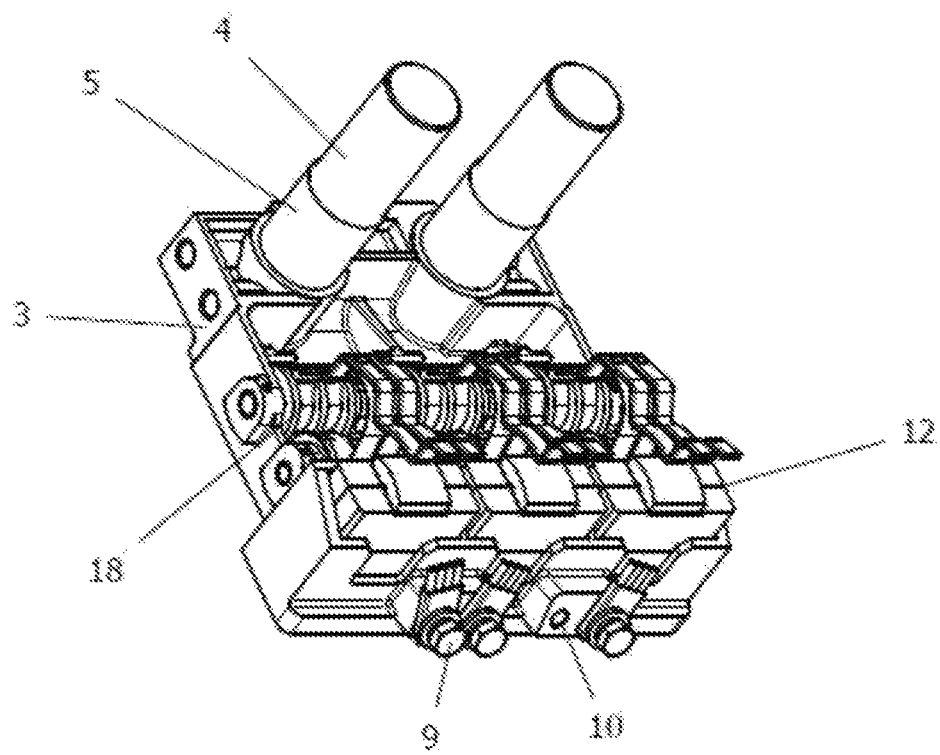
FIG. 1A shows a perspective view of the brush holder for locomotive electric motors, containing three cavities for brushes.
Figure 2A:
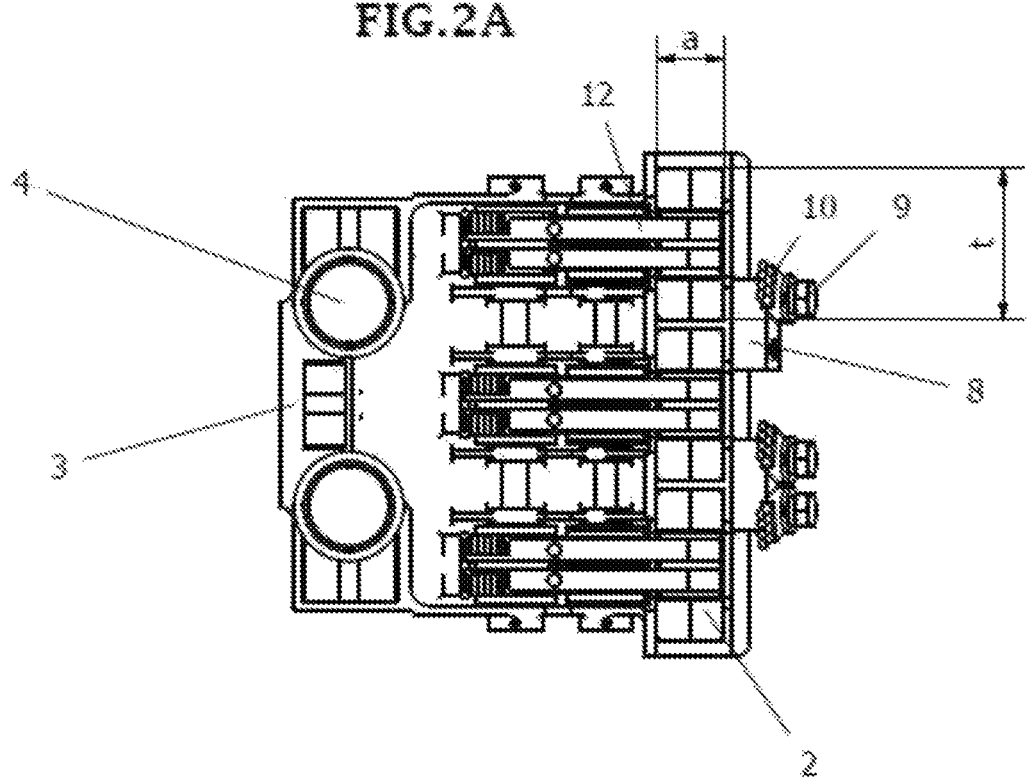
FIG. 2A shows an upper view of the brush holder for locomotive electric motors, containing three cavities for brushes.
Figure 5A:
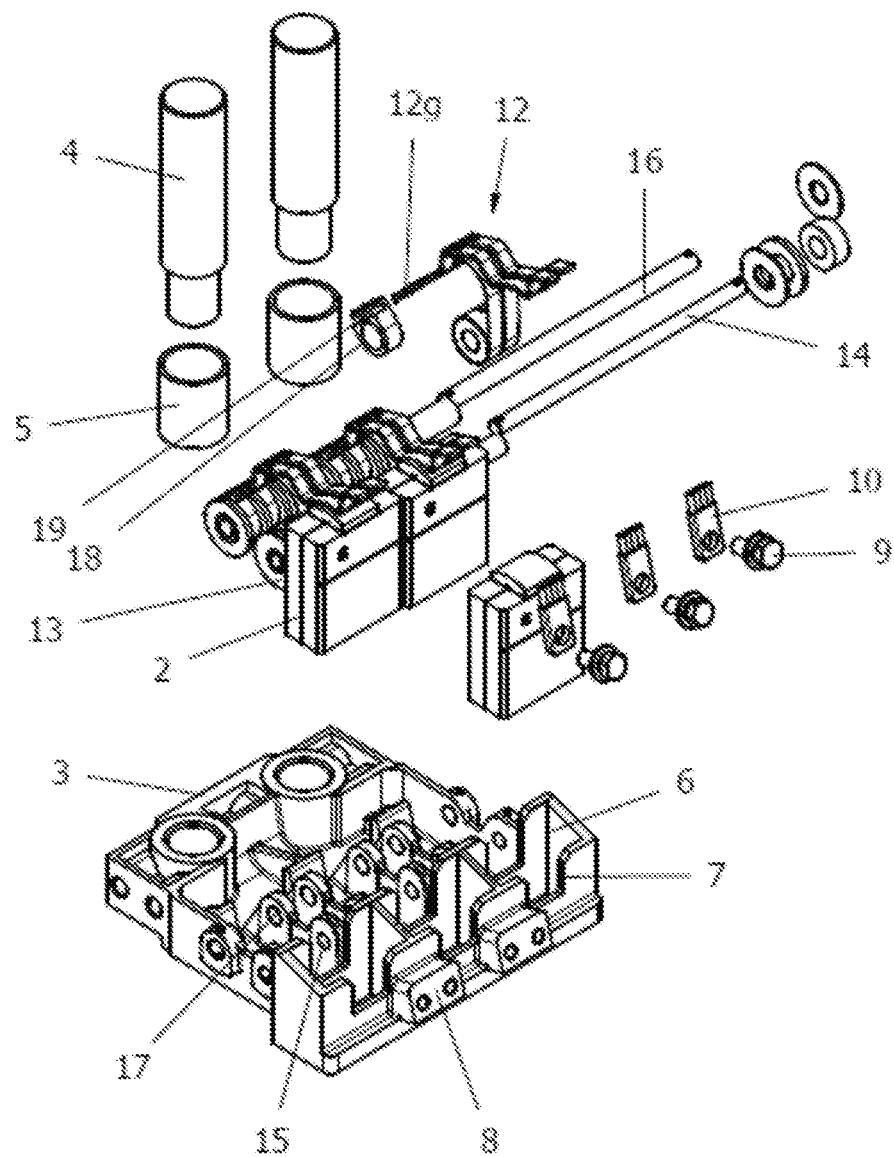
FIG. 5A shows an upper exploded perspective view of the brush holder for locomotive electric motors, containing three cavities for brushes.
Figure 6A:
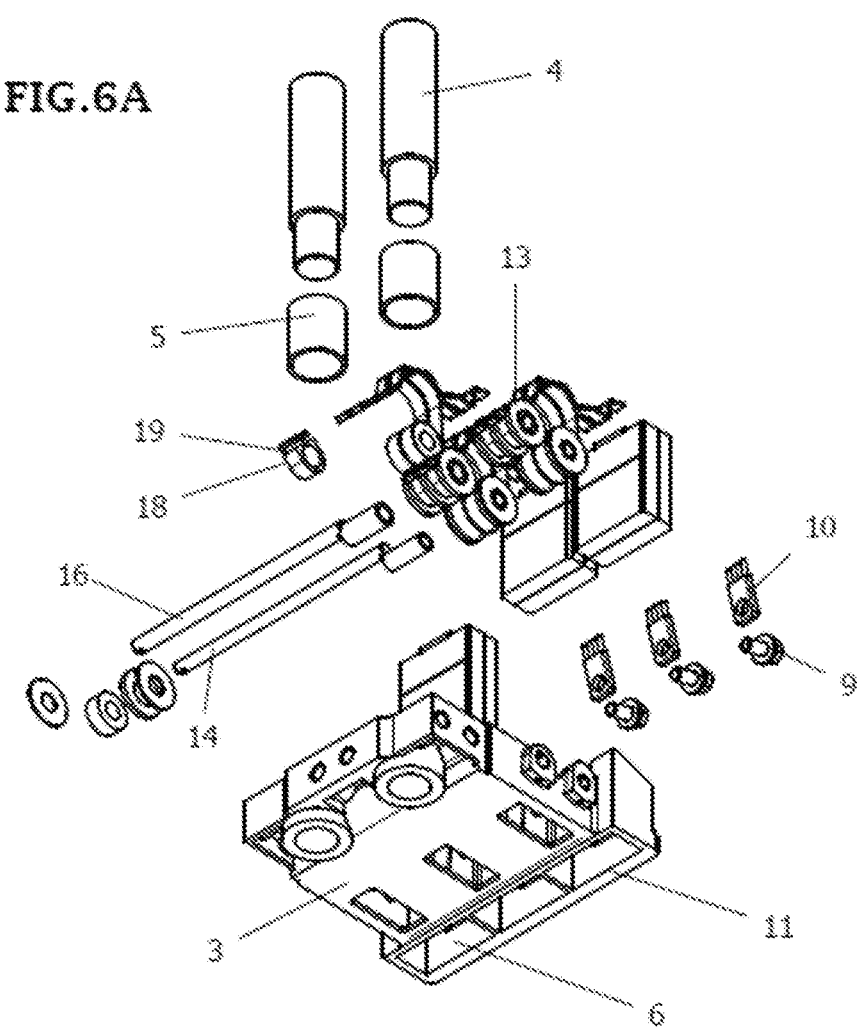
FIG. 6A shows a lower exploded perspective view of the brush holder for locomotive electric motors, containing three cavities for brushes.
Figure 7A:
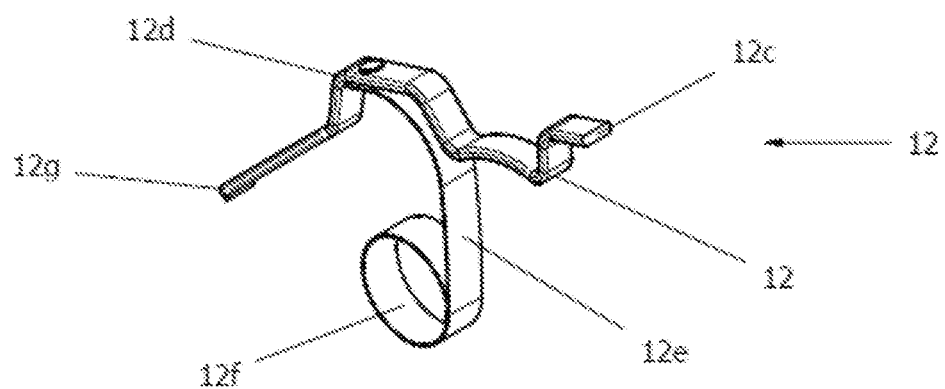
FIG. 7A shows a perspective view of the spring, which is an integral part of the brush holder for locomotive electric motors, containing three cavities for brushes.
Figure 1B:
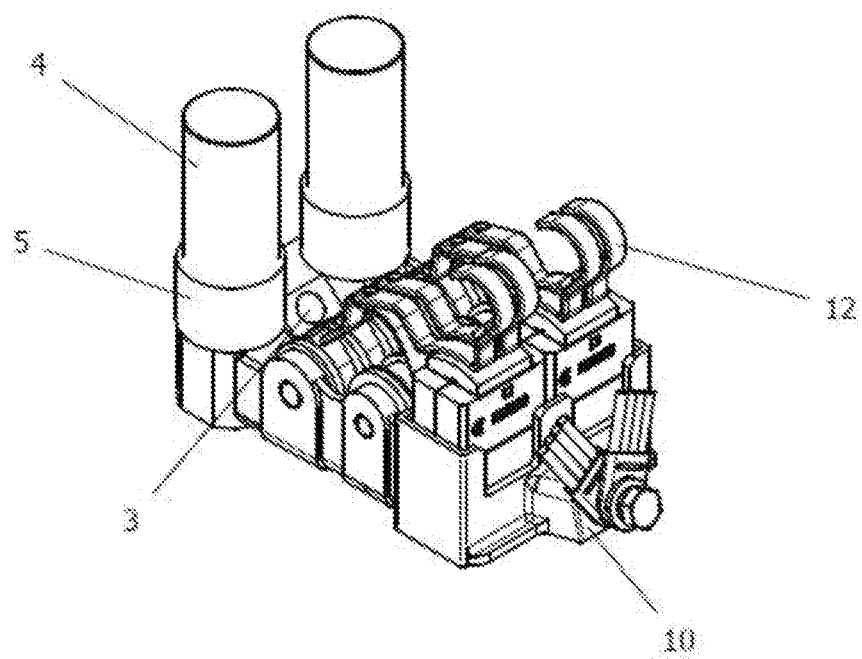
FIG. 1B shows a perspective view of the brush holder for locomotive electric motors, containing one cavity for a brush.
Figure 2B:
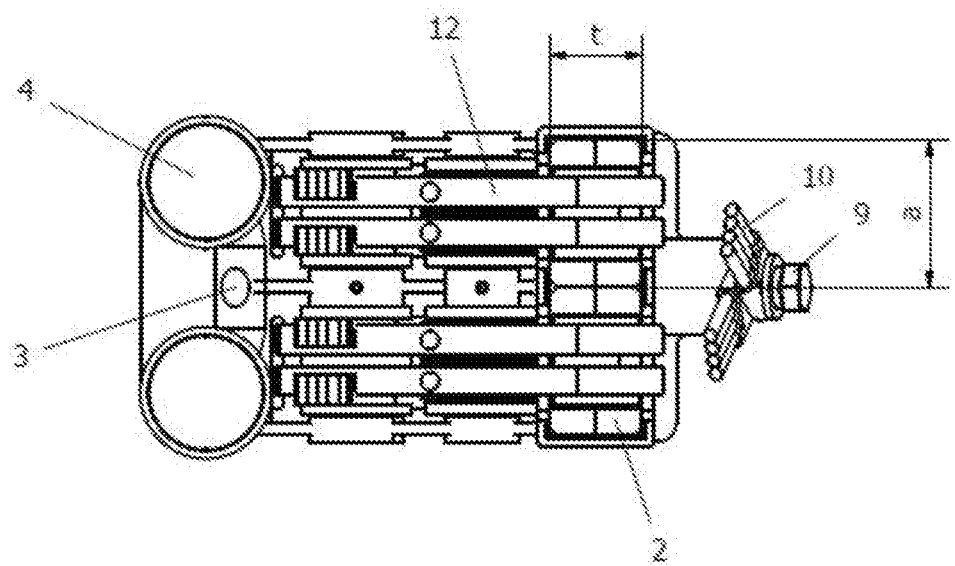
FIG. 2B shows an upper view of the brush holder for locomotive electric motors, having one cavity for a brush.
Figure 3B:
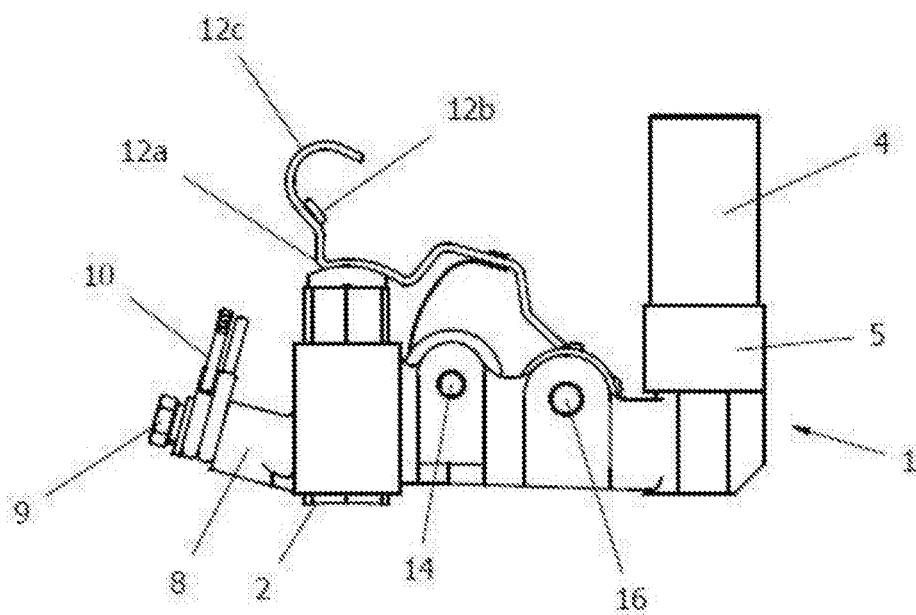
FIG. 3B shows a side view of the brush holder for locomotive electric motors, containing one cavity for a brush.
Figure 4B:
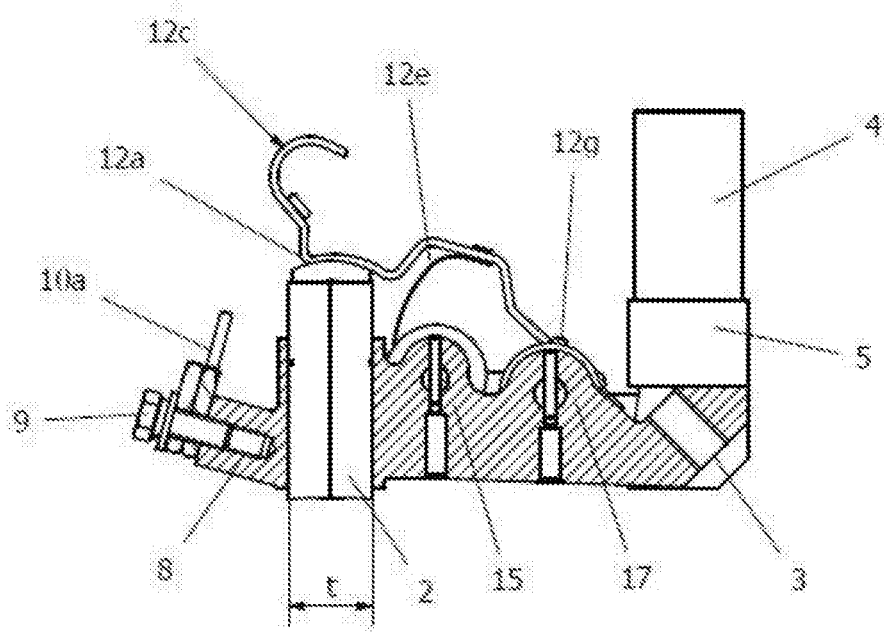
FIG. 4B shows a side cut view of the brush holder for locomotive electric motors, containing one cavity for a brush.
Figure 5B:
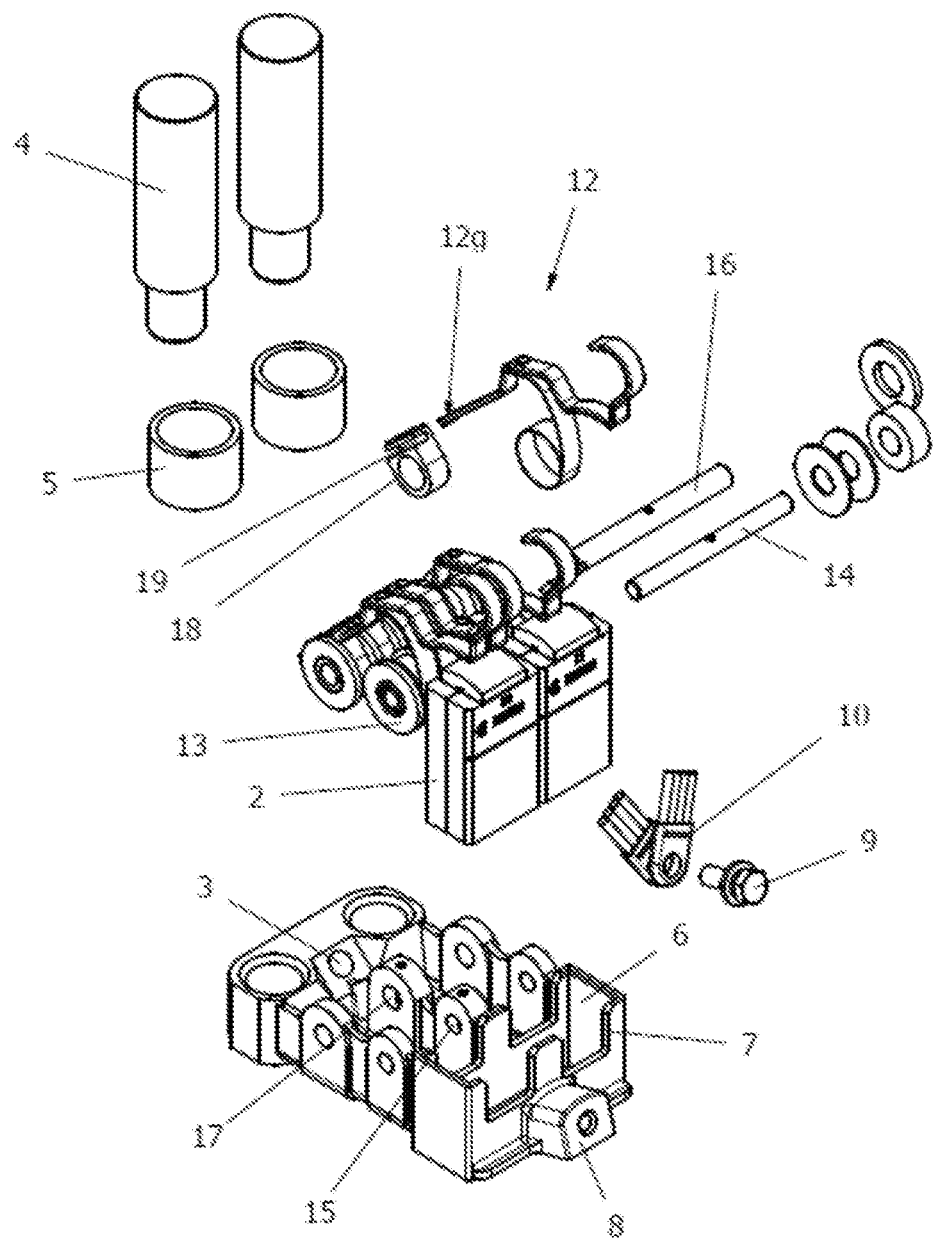
FIG. 5B shows an upper exploded perspective view of the brush holder for locomotive electric motors, having one cavity for a brush.
Figure 6B:
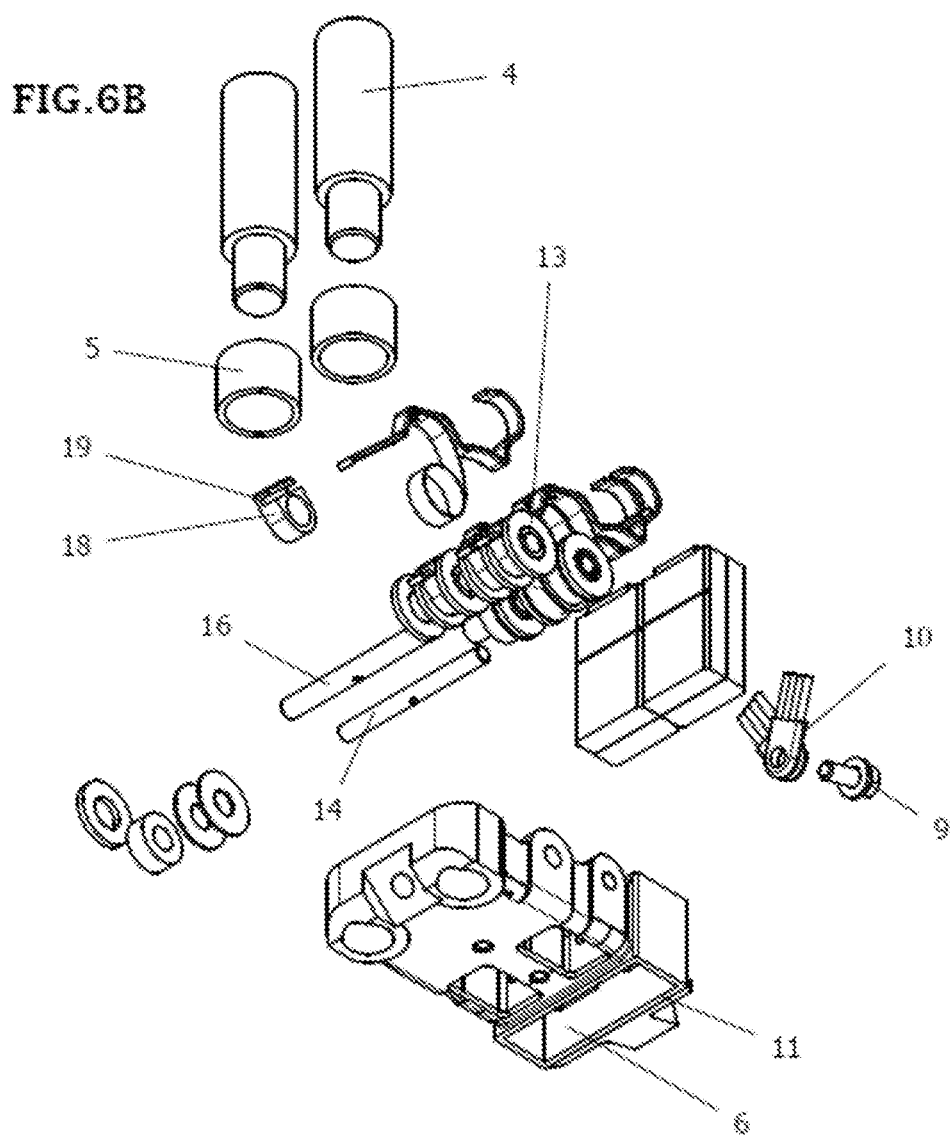
FIG. 6B shows a lower exploded perspective view of the brush holder for locomotive electric motors, having one cavity for a brush.
Figure 7B:
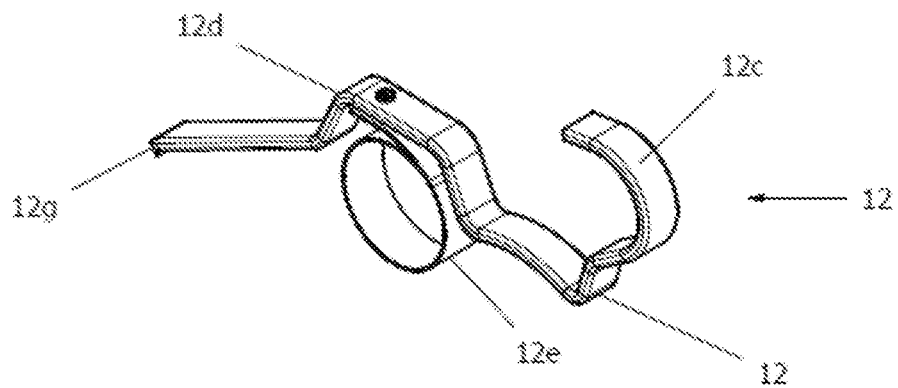
FIG. 7B shows a perspective view of the spring, which is an integral part of the brush holder for locomotive electric motors, having one cavity for a brush.

We should highlight that these drawings are merely representative, and may have variations, as long as they do not escape from the initial requirements.

DETAILED DESCRIPTION OF THE INVENTION

As shown by the above listed drawings, the "BRUSH HOLDER FOR ELECTRIC TRACTION MOTORS FOR LOCOMOTIVES", is conceived as a direct current engine, being used to support, press and support at least one brush (2) on the commuter, wherein said brush holder (1) is constituted by a monoblock base (3), comprising:

at least one linking pin (4) on the rear part of said monoblock base (3), according to the assembly of the brush holder (1) on the structure of the electric motor;

at least one rectangular cavity (6) located at parallel to each other, wherein each one of said cavities is adapted to match a brush (2), which lower edges are projected through the outlet (11) included on the lower edge of said cavities (6);

at least one compliant linking means, so to link at least one brush terminal (10);

at least two pairs of legs (15', 17'), each one having a guide hole (15, 17) through which each one has a central shaft (D2, D3), which direction is parallel to the commuter rotation shaft (D1);

at least one pressure device, comprising a front shaft (14) and a rear shaft (16), received in the respective guide holes (15, 17), and a front shaft (14) and a rear shaft (16) are able to turn around the respective shaft (D2, D3); and at least one pressure finger (12), compliant to press the brush (2) on the electric motor commuter.

Said brush holder, object of the present invention, is characterized by each pressure finger comprising:

an appendix (12a) surrounded by a semicircular or flat cable (12c) located at one edge;

a "U"-shaped segment (12d), located on the medium part of the pressure finger (12); a helical spring (12f) connected to said "U"-shaped segment (12d) by a segment (12e) and a free edge (12g) located on the opposite edge of said pressure finger (12);

a guide wheel (13), defined by a hub and a rim, wherein said rim is partially surrounded by the helical spring (12f), and said front axis (14) is inserted between said hub and the rim;

a linking arm (18) assembled on the rear edge (16) by flat rolling (20), said linking arm (18) having a groove (19), wherein, when the free edge (12g) of the pressure finger (12) is fitted to said groove (19), the pressure finger (12) is held and shaped to press the brush (2) to a partially radial direction for the commuter with a considerably constant force.

As an embodiment, the brush holder (1) comprises two pressure fingers (12) per brush (2). In another embodiment, the connection, on the upper portion of the monoblock base (3), is a pair of linking pins (4), surrounded by an isolating material (5).

In another embodiment, the monoblock base (3) has front openings (7), compliant to allow the passage of the pressure finger (12) upon brush tear, besides comprising at least a protrusion (8) designed on the external part of the rectangular recesses (6), being said protrusion intended to link at least one brush terminal (10) by means of a bolt (9).

In another embodiment of the brush holder (1), the cavities (6) have tangential measurements "τ" between 23.00 mm and 28.00 mm and axial dimensions "a" between 40.00 mm and 57.00 mm.

In still another embodiment, the brush holder is used in an electric motor of a railway traction motor, more specifically a diesel train locomotive.

In a second variation, said brush holder (1) is characterized by two pressure fingers (12) being linked by a segment (12b) extending itself along the axial direction of the commuter, wherein a pressure device is used to keep and press at least one brush (2) on the commuter of a direct current motor, when said brush (2) is assembled on a brush holder (1), said pressure device being constituted by:

a front shaft (14) and a rear shaft (16) located along a shaft (D2, D3) parallel to the rotation shaft (D1) of the commuter, being said front shaft (14) and rear shaft (16) received in guide holes (15, 17) located on the brush holder (1);

two pressure fingers (12), compliant to press the brush (2) on the electric motor commuter, wherein each pressure finger (12) comprises an appendix (12a) surrounded by a semicircular or flat cable (12c) being provided on an edge, a "U"-shaped segment (12d), located on the medium portion of the pressure finger (12), a helical spring (12f) linked to said "U"-shaped segment (12d) by a segment (12e) and a free edge (12g) located on the opposite edge of said pressure finger (12);

two pressure fingers (12) are linked by a segment (12b) with a constituent extending along the axial direction (D1) of the commuter;

a guide wheel (13), defined by a hub and a rim, wherein said rim is partially surrounded by the helical spring (12f) and the front shaft (14) is inserted between said hub and the rim; and a linking arm (18) assembled on the rear shaft (16) by a flat roller (20), said linking arm (18) having a groove (19) wherein, when the free edge (12g) of the pressure finger is engaged to said groove (19), the pressure finger (12) is kept and shaped to press the brush (2) to a partially radial direction towards the commuter with a considerably constant force.

Therefore, the present invention aims to solve the main inconveniences as found in the already existing models, as follows:

increase in the sparking level and thus in maintenance intervals are possible, thanks to the changing slope of the carbon brush, a brush design working at 25° over a radial condition with the commuter, the brush measurements over the tangential coverage ratio being defined by the engine configuration and the existence of a new form of pressure system for the brush to increase its stability over constant pressure; and use of a pressure spring with a curved shape forming an appendix on its lower portion resting on the upper part of the brush, pressing it inside the brush housing on the brush support, while holding a cable to facilitate brush maintenance and substitution.

By keeping the same isolated pin (4, 5) and considering the available space on the structure of the traction motor, the new brush holders may be installed on the motor structure with no need for any alteration.

We can thus conclude from the above that the "BRUSH HOLDER FOR ELECTRIC TRACTION MOTORS FOR LOCOMOTIVES" is characterized as an improvement having all functional qualities fully justifying the patent application as a Privilege of Invention.

Obviously, it will be realized that, although the above disclosure was presented as an illustrative example, all other modifications and variations performed to this embodiment, as they would be evident for the experts in the art, are considered within the wide scope and reach of this Privilege of Invention, as per the following set of claims.

What is claimed is:

1. Brush holder for electric traction motors for locomotives, being the brush holder (1) intended for a direct current motor used to support, press and support at least one brush (2) on the commuter, which brush holder (1) is constituted by a monoblock base (3), characterized by comprising: at least one linking pin (4) on the rear part of said monoblock base (3), according to the assembly of the brush holder (1) to the structure of the electric motor; at least one rectangular groove (6) located at parallel one to each other, wherein each one of such grooves is adapted to match a brush (2) and which lower edges are projected through the outlet (11) included in the lower edge of said grooves (6); at least one compliant linking means to link at least one brush terminal (10); at least two pairs of legs (15', 17'), each one having a guide hole (15, 17) through which each one has a central shaft (D2, D3), which direction is parallel to the rotation shaft (D1) of the commuter; at least one pressure device, comprising a front shaft (14) and a rear shaft (16), received in the respective guide holes (15, 17), a front shaft (14) and a rear shaft (16) are able to turn around their respective shafts (D2, D3); and at least one compliant pressure finger (12) to press the brush (2) on the commuter of the electric motor; each pressure finger of the brush holder comprises: an appendix (12a) surrounded by a semicircular or flat cable (12c) which is located at an edge; a "U"-shaped segment (12d), located at the medium part of the pressure finger (12); a helical spring (12f) connected to said "U"-shaped segment (12d) by a segment (12e); and a free edge (12g) located at the opposed edge of said pressure finger (12); a guide wheel (13), defined by a hub and a rim, wherein said rim is partially surrounded by the helical spring (12f) and said front shaft (14) is inserted between said hub and the rim; a linking arm (18) is assembled on the rear shaft (16) by flat rollers (20), said linking arm (18) having a groove (19), wherein, when the free edge (12g) of the pressure finger (12) is fitted to said groove (19), the pressure finger (12) is kept and shaped to press the brush (2) towards a partially radial direction to the commuter with a considerably constant force.

2. Brush holder for electric traction motors for locomotives, of claim 1, characterized by comprising two pressure fingers (12) per brush (2).

3. Brush holder for electric traction motors for locomotives, of claim 1, characterized by the connection, on the rear part of the monoblock base (3), being a pair of linking pins (4), surrounded by an isolating material (5).

4. Brush holder for electric traction motors for locomotives, of claim 1, characterized by the monoblock base (3) having compliant front openings (7) to provide a passage for the pressure finger (12) when the brush is worn.

5. Brush holder for electric traction motors for locomotives, of claim 1, characterized by the grooves (6) having tangential measurements "t" between 23.00 mm and 28.00 mm and axial measurements "a" between 40.00 mm and 57.00 mm.

6. Brush holder for electric traction motors for locomotives, of claim 1, characterized by the monoblock base (3) comprising at least one protrusion (8) designed on the external portion of the rectangular recesses (6), being said protrusion compliant to link at least one brush terminal (10) by means of a bolt (9).

7. Brush holder for electric traction motors for locomotives, of claim 1, characterized by the brush holder (1) being used for an electric motor of a railway traction motor.

8. Brush holder for electric traction motors for locomotives, of claim 1, characterized by the railway traction motor being a railway diesel locomotive.

9. Brush holder for electric traction motors for locomotives, which brush holder (1) is intended for a direct current motor used to support, press and support at least one brush (2) on the commuter, which brush holder (1) is constituted by a monoblock base (3), characterized by comprising: at least one linking pin (4) on the rear part of said monoblock base (3), according to the assembly of the brush holder (1) on the structure of the electric motor; at least one rectangular groove (6) located at parallel one to each other, wherein each one of these grooves is adapted to match a brush (2) and which lower edges are projected through an outlet (11) included in the lower edge of said grooves (6); at least one linking means compliant to link at least one brush terminal (10); at least two pairs of legs (15', 17'), each one having a guide hole (15, 17) through which each one has a central shaft (D2, D3), which direction is parallel to the rotation shaft (D1) of the commuter; at least one pressure device, comprising a front shaft (14) and a rear shaft (16), received in the respective guide holes (15, 17), wherein a front shaft (14) and a rear shaft (16) are able to turn around their respective shafts (D2, D3); and at least one pressure finger (12), compliant to press the brush (2) on the commuter of the electric motor; both pressure fingers (12) of the brush holder (1) are connected by a segment (12b) extending along the axial direction of the commuter; a pressure device used to maintain and press at least one brush (2) in the commuter of a direct current motor, when said brush (2) is assembled in a brush holder (1), said pressure device being constituted by: a front shaft (14) and a rear shaft (16) located along a shaft (D2, D3) which is parallel to the rotation shaft (D1) of the commuter, wherein said front shaft (14) and rear shaft (16) are received in guide holes (15, 17) located on the brush holder (1); two pressure fingers (12) compliant to press the brush (2) on the commuter of the electric motor, wherein each pressure finger (12) comprises an appendix (12a) surrounded by a semicircular or flat cable (12c) located at an edge, a "U"-shaped segment (12d), located on the medium part of the pressure finger (12), a helical spring (12f) linked to said "U"-shaped segment (12d) by a segment (12e) and a free edge (12g) located on the opposite edge of said pressure finger (12); two pressure fingers (12) are linked by a segment (12b) with a constituent extending along the axial direction (D1) of the commuter; a guide wheel (13), defined by a hub and a rim, wherein said rim is partially surrounded by the helical spring (12f) and the front shaft (14) is inserted between said hub and the rim; a linking arm (18) assembled on the rear shaft (16) by a flat roller (20), said linking arm (18) having a groove (19) wherein, when the free edge (12g) of the pressure finger (12) is engaged in said groove (19), the pressure finger (12) is kept and formed to press the brush (2) to a partially radial direction towards the commuter with a considerably constant force.

* * * * *